US009618640B2

(12) United States Patent
McDavid

(10) Patent No.: US 9,618,640 B2
(45) Date of Patent: Apr. 11, 2017

(54) REMOVING OFFSET FROM SEISMIC SIGNALS

(71) Applicant: INOVA, LTD., Grand Cayman (KY)

(72) Inventor: William T. McDavid, Richardson, TX (US)

(73) Assignee: INOVA, LTD., George Town, Grand Cayman (KY)

( * ) Notice: Subject to any disclaimer, the term of this patent is extended or adjusted under 35 U.S.C. 154(b) by 308 days.

(21) Appl. No.: 14/306,836

(22) Filed: Jun. 17, 2014

(65) Prior Publication Data

US 2014/0369166 A1 Dec. 18, 2014

Related U.S. Application Data

(60) Provisional application No. 61/836,834, filed on Jun. 19, 2013, provisional application No. 61/835,946, filed on Jun. 17, 2013.

(51) Int. Cl.
| | | |
|---|---|---|
| *G01V 1/28* | (2006.01) | |
| *G01V 1/36* | (2006.01) | |
| *G01V 1/22* | (2006.01) | |

(52) U.S. Cl.
CPC ............... *G01V 1/36* (2013.01); *G01V 1/22* (2013.01); *G01V 1/364* (2013.01); *G01V 2210/324* (2013.01)

(58) Field of Classification Search
CPC ..... G01V 1/364; G01V 1/28; G01V 2210/324
USPC .......................................................... 367/43
See application file for complete search history.

(56) References Cited

U.S. PATENT DOCUMENTS

| | | | |
|---|---|---|---|
| 3,701,091 A | 10/1972 | Lenihan | |
| 4,545,026 A | 10/1985 | Baggett et al. | |
| 5,600,318 A * | 2/1997 | Li | G01V 1/247 341/143 |
| 7,085,335 B2 * | 8/2006 | Rawlins | H04B 1/30 375/346 |
| 2002/0168951 A1 | 11/2002 | Paulus et al. | |
| 2004/0145502 A1 | 7/2004 | Thomson | |

OTHER PUBLICATIONS

PCT/US2014/042720—International Search Report dated Oct. 28, 2014.

* cited by examiner

*Primary Examiner* — Ian J Lobo
(74) *Attorney, Agent, or Firm* — Mossman, Kumar & Tyler PC

(57) ABSTRACT

Methods, systems, and devices for conducting a seismic survey. The system includes at least one seismic sensor configured to supply a signal responsive to reflections of acoustic energy from an earth surface; and at least one processor configured to: mitigate sensor offset from a sequence of samples representative of the signal by filtering the sequence of samples using a symmetrical-in-time finite impulse response (FIR) filter. The FIR filter may approximate a sinc-in-frequency filter. The at least one processor may be configured to process the sequence of samples using a plurality of filter stages that are rectangular in time. The length of one filter stage of the plurality of filter stages may be different than the length of another filter stage of the plurality of filter stages.

12 Claims, 11 Drawing Sheets

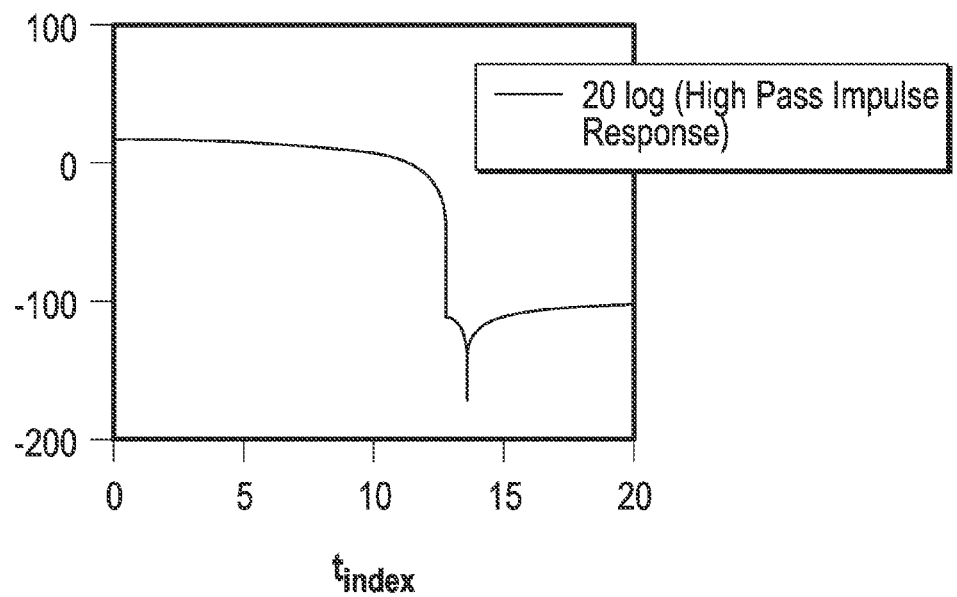
FIG. 4G
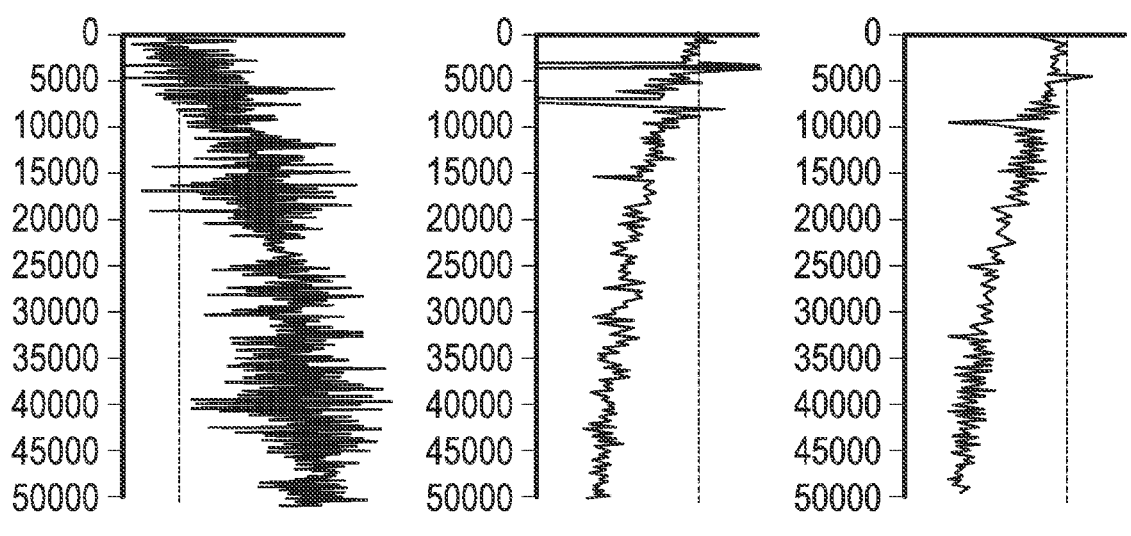
vs0ch2m1  
FIG. 5A
vs1ch1m1  
FIG. 5B
vs2ch1m1  
FIG. 5C

REMOVING OFFSET FROM SEISMIC SIGNALS

CROSS REFERENCE TO RELATED APPLICATIONS

This applications claims priority from U.S. Provisional Application Ser. No.: 61/836,834 filed Jun. 19, 2013 and U.S. Provisional Application Ser. No.: 61/835,946 filed Jun. 17, 2013, the disclosure of which is incorporated here by reference in their entirety.

FIELD OF THE DISCLOSURE

This disclosure generally relates to conducting a seismic survey using a network configured to transmit data.

BACKGROUND OF THE DISCLOSURE

Seismic surveys are conducted to map subsurface structures to identify and develop oil and gas reservoirs. Seismic surveys are typically performed to estimate the location and quantities of oil and gas fields prior to developing the fields (drilling wells) and also to determine the changes in the reservoir over time subsequent to the drilling of wells. On land, seismic surveys are conducted by deploying an array of seismic sensors (also referred to as seismic receivers) over selected geographical regions. These arrays typically cover 75-125 square kilometers or more of a geographic area and include 30,000 to 100,000 seismic sensors or more. The number of sensors continues to increase. The seismic sensors (such as, geophones or accelerometers) are coupled to the ground in the form of a grid. An energy source, such as an explosive charge (buried dynamite for example) or a mobile vibratory source, is used at selected spaced apart locations in the geographical area to generate or induce acoustic waves or signals (also referred to as acoustic energy) into the subsurface. The acoustic waves generated into the subsurface reflect back to the surface from subsurface formation discontinuities, such as those formed by oil and gas reservoirs. Similarly, seismic surveys may be conducted at sea using seismic arrays modified for such use. The reflections are sensed or detected at the surface by the seismic sensors (hydrophones, geophones, etc.). Data acquisition units deployed in the field proximate the seismic sensors may be configured to receive signals from their associated seismic sensors, at least partially process the received signals, and transmit the processed signals to a remote unit (typically a central control or computer unit placed on a mobile unit). The central unit typically controls at least some of the operations of the data acquisition units and may process the seismic data received from all of the data acquisition units and/or record the processed data on data storage devices for further processing. The sensing, processing and recording of the seismic waves is referred to as seismic data acquisition. Two-dimensional and/or three-dimensional maps of the subsurface structures (also known as the "seismic image") may be generated from the recorded seismic data. These maps may then be used to make decisions about drilling locations, reservoir size, pay zone depth, and estimates of the production of hydrocarbons.

A common architecture of seismic data acquisition systems is a point-to-point cable connection of all of the seismic sensors. Typically, output signals from the sensors in the array are collected by data acquisition units attached to one or more sensors, digitized and relayed down the cable lines to a high-speed backbone field processing device or field box. The high-speed backbone is typically connected via a point-to-point relay with other field boxes to a central recording system, where all of the data are recorded onto a storage medium, such as a magnetic tape. Seismic data may be recorded at the field boxes for later retrieval, and in some cases a leading field box is used to communicate with the central recording system over a radio link (radio frequency link or an "RF" link).

Seismic data acquisition systems typically include analog digitizing circuits and sensors that digitize within the sensing process. Seismic sensors may be subject to unpredictable changes in sensor response resulting from changes in environmental and/or instrument conditions. These changes may manifest as a direct current offset from the nominal reference point. For example, the output of these circuits is subject to an average value that changes with temperature. The average value of the circuit taken as the zero reference at one point in time will not necessarily serve as the proper reference after the temperature has changed, or in some cases, after components have aged. The change of the ongoing average signal value from the reference value is referred to here as the offset. Such an offset should be sufficiently small relative to the signal, so as not to be noticed.

Typical seismic instruments (e.g., seismic sensors) introduce significant DC offset that is effectively added to the desired signal from the sensor. Removing DC offset may facilitate processing and analysis of the data.

SUMMARY OF THE DISCLOSURE

In aspects, the present disclosure is related to methods, systems, and devices for conducting a seismic survey including transmitting seismic data.

One embodiment according to the present disclosure includes a system for conducting a seismic survey. The system may include at least one seismic sensor configured to supply a signal responsive to reflections of acoustic energy from an earth surface; and at least one processor configured to: mitigate sensor offset from a sequence of samples representative of the signal by filtering the sequence of samples using a symmetrical-in-time finite impulse response (FIR) filter. The signal may comprise a direct current (DC) offset. The sequence of samples may comprise at least one of: i) discrete samples of an analog signal taken at regular intervals; ii) discrete samples of a discrete signal taken at regular intervals; and iii) a sequence of values of a discrete signal. The FIR filter may approximate a sinc-in-frequency filter. The at least one processor may be configured to process the sequence of samples using a plurality of filter stages that are rectangular in time. The length of one filter stage of the plurality of filter stages may be different than the length of another filter stage of the plurality of filter stages. The lengths of the filter stages are configured to minimize signal ripple in an impulse response associated with the FIR filter by aligning at least one null of one filter stage of the plurality of filter stages between two other nulls of another stage of the plurality of filter stages to minimize peaks of a composite frequency response.

Another embodiment of the present disclosure is a method of conducting a seismic survey. The method may include receiving a signal from at least one seismic sensor; and mitigating sensor offset from a sequence of samples representative of the seismic signal by filtering the sequence of samples using a symmetrical-in-time finite impulse response (FIR) filter. The signal may comprise a direct current (DC) offset. The sequence of samples may comprise at least one of: i) discrete samples of an analog signal taken at regular intervals; ii) discrete samples of a discrete signal taken at regular intervals; and iii) a sequence of values of a discrete signal. The FIR filter may approximate a sinc-in-frequency filter. Filtering the sequence of samples may comprise processing the sequence of samples using a plurality of filter stages that are rectangular in time. The length of one filter stage of the plurality of filter stages may be different than the length of another filter stage of the plurality of filter stages. The lengths of the filter stages are configured to minimize signal ripple in an impulse response associated with the FIR filter by aligning at least one null of one filter stage of the plurality of filter stages between two other nulls of another stage of the plurality of filter stages to minimize peaks of a composite frequency response. The at least one seismic sensor may include a geophone.

The method may further include converting the analog signal to a discrete signal comprising the sequence of samples. The method may further include generating the acoustic energy from a seismic source.

Another embodiment of the present disclosure is a method of mitigating sensor offset from a sequence of samples representative of a response of a seismic sensor to reflections of acoustic energy from an earth surface. The method may include filtering the sequence of samples using a symmetrical-in-time finite impulse response (FIR) filter. The sequence of samples may comprise at least one of: i) discrete samples of an analog signal taken at regular intervals; ii) discrete samples of a discrete signal taken at regular intervals; iii) a sequence of values of a discrete signal. The FIR filter may approximate a sinc-in-frequency filter. Filtering the sequence of samples may include processing the sequence of samples using a plurality of filter stages that are rectangular in time. The length of one filter stage of the plurality of filter stages may be different than the length of another filter stage of the plurality of filter stages. The lengths of the filter stages are configured to minimize signal ripple in an impulse response associated with the FIR filter by aligning at least one null of one filter stage of the plurality of filter stages between two other nulls of another stage of the plurality of filter stages to minimize peaks of a composite frequency response.

Software aspects of the invention may include at least one non-transitory computer program product having machine readable instructions thereon, that when executed by at least one processor carry out methods described herein.

Another embodiment of the present disclosure is a computer program product comprising a non-transitory computer readable medium having disposed thereon computer program instructions for mitigating sensor offset from a sequence of samples representative of a response of a seismic sensor to reflections of acoustic energy from an earth surface. The instructions may include instructions for filtering the sequence of samples using a symmetrical-in-time finite impulse response (FIR) filter. The sequence of samples may comprise at least one of: i) discrete samples of an analog signal taken at regular intervals; ii) discrete samples of a discrete signal taken at regular intervals; and iii) a sequence of values of a discrete signal. The FIR filter may approximate a sinc-in-frequency filter. The media may have disposed thereon further instructions for processing the sequence of samples using a plurality of filter stages that are rectangular in time. The length of one filter stage of the plurality of filter stages may be different than the length of another filter stage of the plurality of filter stages. The lengths of the filter stages are configured to minimize signal ripple in an impulse response associated with the FIR filter by aligning at least one null of one filter stage of the plurality of filter stages between two other nulls of another stage of the plurality of filter stages to minimize peaks of a composite frequency response.

Examples of some features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein:

FIGS. 4A-4G show graphical depictions of signals illustrating the effects of filters according to embodiments of the present disclosure;

FIGS. 5A-5C show example seismic signals according to embodiments of the present disclosure;

DETAILED DESCRIPTION

The present disclosure relates to devices and methods for conducting seismic survey activities relating to seismic data acquisition. The present disclosure may be implemented in embodiments of different forms. The drawings shown and the descriptions provided herein correspond to certain specific embodiments of the present disclosure for the purposes of explanation of the concepts contained in the disclosure with the understanding that the present disclosure is to be considered an exemplification of the principles of the disclosure, and is not intended to limit the scope of the disclosure to the illustrated drawings and the description herein. A description for some embodiments for conducting a seismic survey follows below.

Aspects of the present disclosure enable removal of a DC component of seismic data while minimizing distortion of the signal from the sensor. Historically, circuit elements such as, for example, a DC capacitor, were used to remove DC offset. Together with the following resistive impedance, such an R-C filter exhibits a phase shift proximate to the corner frequency. The phase change is not linear with frequency and so is the source of phase distortion. In more recent history, the offset was removed by a simple IIR filter (Infinite Impulse Response), which also introduces a phase shift, making data processing problematic.

More recently, DC offset has been removed on a per-record basis. When records are concatenated to produce continuous data, which may be critical in some applications, removal on a per-record basis introduces steps at transition points between records. Generally, embodiments of the present disclosure remove offset with substantially no phase distortion and very small amplitude changes down to frequencies well below the traditional seismic band and including an extended band of interest applicable to micro-seismic applications.

Figure 1:
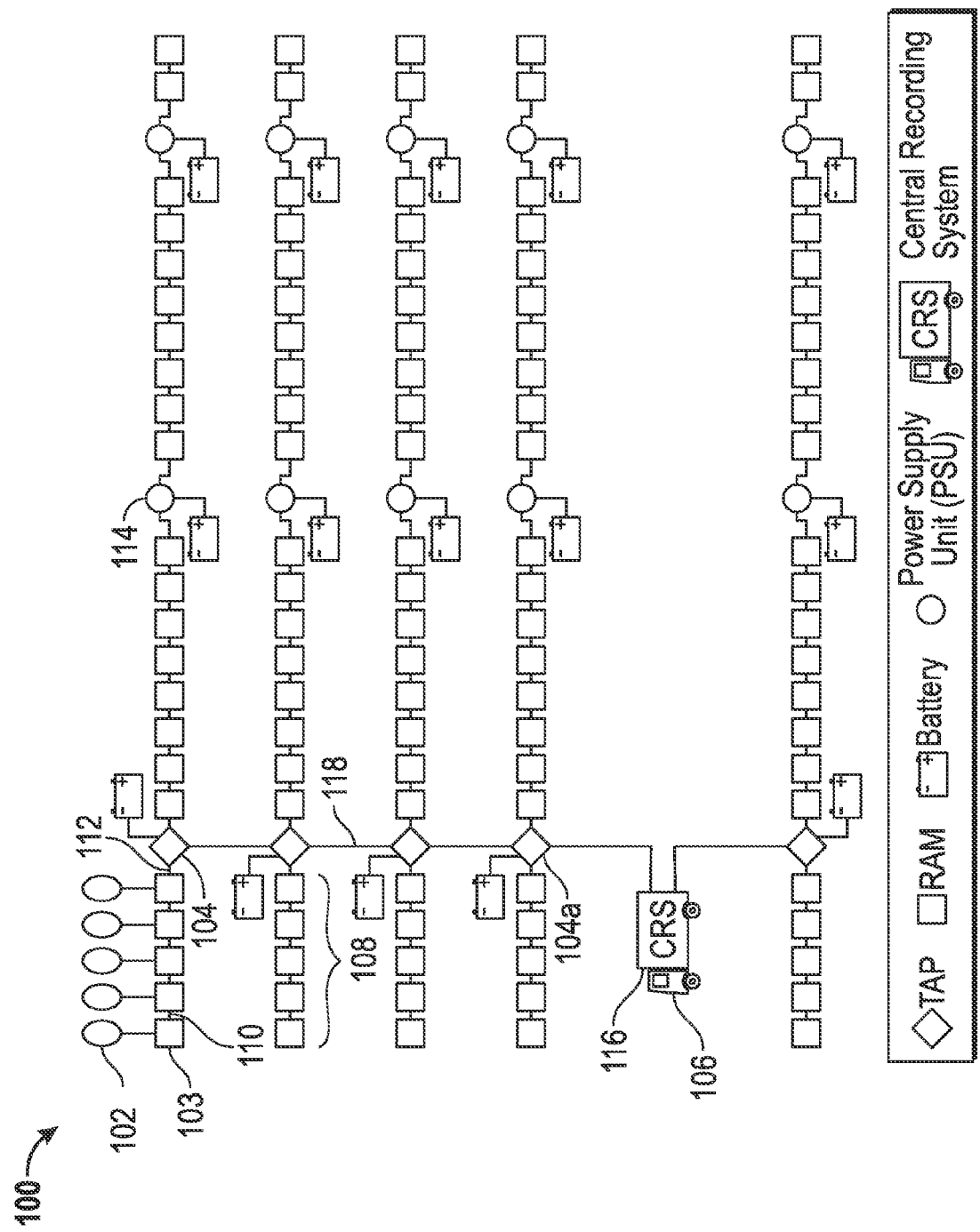
FIG. 1 shows a schematic of a seismic survey system according to one embodiment of the present disclosure.

FIG. 1 depicts an embodiment of a cable seismic data acquisition system 100. The cable seismic data acquisition system 100 includes a seismic source (not shown) providing acoustic energy waves into the earth surface and a plurality of interconnected seismic devices distributed across an earth surface at intervals. The system includes an array (string) of spaced-apart seismic sensor units 102. The seismic sensor units are coupled to at least one seismic device through cabling. The seismic sensor units provide seismic signals to the plurality of seismic devices in response to detected reflections from the acoustic energy waves. The system also includes a central recording system receiving telemetry data from one or more of the plurality of seismic devices through the data communication device.

Seismic sensor units 102 may include, but are not limited to, one more of: geophones and hydrophones. Each sensor 102 is typically coupled via cabling to a seismic data acquisition device (such as remote acquisition module (RAM) 103), and several of the data acquisition devices and associated sensors are coupled via cabling 110 to form a line or group 108. The group 108 is then coupled via cabling 112 to a line tap (such as fiber TAP unit (FTU) 104). Cable 112 may include, but is not limited to, one or more of: (i) copper conductors and (ii) fiber optic cable. Several FTUs 104 and associated lines 112 are usually coupled together by cabling, such as shown by the baseline cable 118. Baseline cable 118 includes fiber optic cable.

A RAM 103 may be configured to record analog seismic signals that are generated by seismic sensors 102, including, but not limited to, geophones and hydrophones. The RAM 103 may be configured to convert analog signals from the seismic sensors 102 into digital signals. The digitized information may then be transmitted to an FTU 104. Some RAMs 103 are configured to relay signals from other RAMs 103 in group 108, in addition to receiving signals from one or more seismic sensors 102. The digitized information transmitted by the RAM 103 may be augmented with status information. The FTU 104 may be configured to transmit the digitized information to a central recording system (CRS) 106. In some embodiments, the RAM 103 may be configured to receive programming and/or parameter information downloads from the CRS 106. RAMs 103 generally receive power from another device, such as a power supply unit (PSU) 114 or FTU 104, however, RAMs 103 may be configured to include a battery.

The FTU 104 may be configured to receive digital information from one or more RAMs 103 and retransmit that information to the CRS 106. In some embodiments, retransmitted digital information may be augmented with status information for the FTU 104. The FTU 104 may also be configured to supply power to one or more RAMs 103. FTU 104 may itself receive power from a battery 126 or PSU 114.

The devices involved in seismic data acquisition may be collectively referred to as "seismic devices," which may include, but is not limited to: seismic sensors 102, RAMs 103, and FTUs 104, CRS 106, and auxiliary device 116.

In some embodiments, the RAM 103 and/or the FTU 104 may be used as an auxiliary device 116. An auxiliary device 116 may be configured to operate as a timing device or processing device. The CRS 106 may be positioned in a recording truck or other comparable location.

In the field, the sensors 102 may be spaced between 10-50 meters. Each of the FTUs 104 typically performs some signal processing and then stores the processed signals as seismic information. The FTUs 104 may be coupled, either in parallel or in series, with one of the units 104a serving as an interface between the CRS 106 and one or more FTUs 104. This system may use wired communication media, e.g., RS-232, Ethernet, USB, etc. In the cable system of FIG. 1, data are usually relayed from RAM 103 to the next RAM 103 and through several FTUs 104 before such data reaches the CRS 106.

In a typical configuration, a plurality of RAMs 103 may be laid out in intervals (such as 12 @ 55 meters) and connected to receiver cable lines. The receiver cable lines may also be connected to FTUs 104. The FTUs 104 may be laid out at intersecting points of the receiver line cables 112 and baseline fiber optic cables 118. The FTUs 104 may be connected to other FTUs 104 and/or the CRS 106 via fiber baseline cables 118.

In wireless embodiments, the FTUs 104 may communicate with the CRS 106 using radio frequency transmissions and are typically bandwidth limited. In traditional wireless seismic data acquisition systems, an attribute (physical or seismic) degradation affecting the data quality is typically detected by monitoring (printing and viewing) shot (source activation) records immediately after recording.

Figure 2:
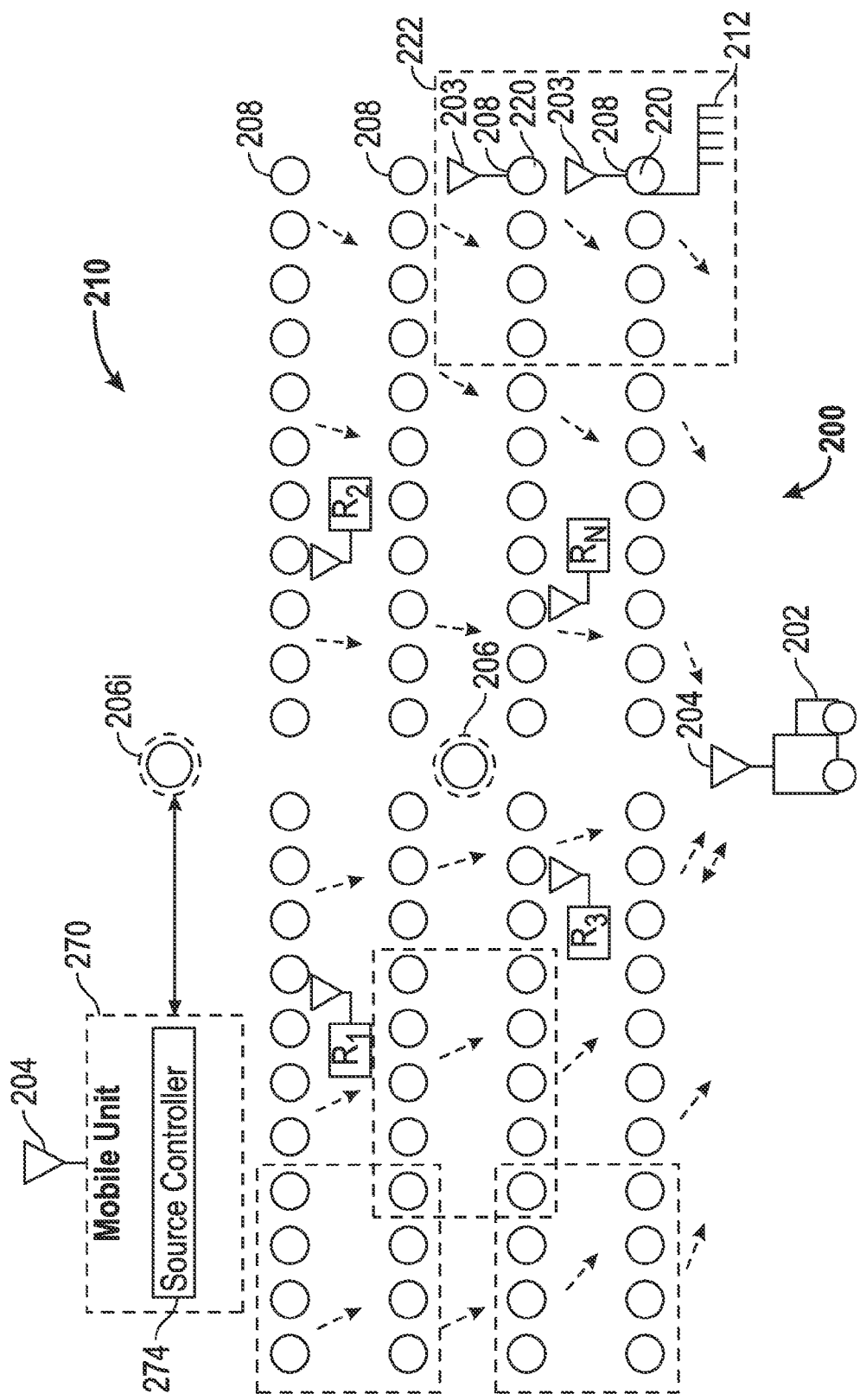
FIG. 2 shows a schematic of a wireless seismic survey system according to one embodiment of the present disclosure.

Referring to FIG. 2, a representation of a wireless seismic data acquisition system 200 is shown according to one embodiment of the present disclosure. The system 200 includes a central controller or control unit (CU) 202 in data communication with each of a number of wireless field station units (FSU) or sensor stations 208 forming an array (spread) 210 for seismic data acquisition. The wireless communication between the central controller 202 with the FSUs may be direct bi-directional wireless communication or via an intermediate unit such as a repeater unit (RU)(not shown). Each sensor station 208 includes one or more sensors 212 for sensing seismic energy. The sensors 212 may be any suitable seismic sensors, including geophones, and one or more component accelerometers.

Direct communication as used herein refers to individualized data flow as depicted in FIG. 2 by dashed arrows. A wireless communication system can be a VHF, UHF, WiFi, or other wireless radio communication system. The data flow can be bi-directional to allow one or more of: transmission of command and control instructions from the central controller 202 to each wireless sensor station 208; and transmission of status signals, operating conditions and/or selected pre-processed seismic information from each wireless sensor station 208 to the central controller 202. The communication might be in the form of radio signals transmitted from and received by the sensor stations 208 and central controller 202 via suitable antennas 203 and 204 respectively.

In an active mode, the system 200 uses one or more seismic energy sources 206 to generate seismic energy of known characteristics, such as magnitude, frequency etc., at known locations in the seismic spread to impart seismic energy into the subterranean formation. A representative seismic energy source is designated with numeral 206i. Activation (or more commonly, "shooting" or "firing") of the source 206i may be initiated locally by a mobile unit 270.

In other embodiments, sensor stations 208 may be autonomous once deployed in the field. Some sensor stations may include GPS circuitry for determining position or to acquire timing information. Such units may contain sufficient memory (e.g., 16 GB or more) for extended recording. In some cases, continuous recording is employed without the need for synchronization with shooting events.

In some embodiments, after shooting is completed, sensor stations may be harvested and taken to a central location for data retrieval. Data retrieval may also be conducted in the field by approaching the sensors and retrieving the data. In either case, data retrieval may be performed via wired or wireless connection, or combinations of the same. In some cases sample data may be extracted from a sensor station, such as, for example, to test the data quality to ensure device performance or positioning or to preview the characteristics of the measured area.

Aspects of the present disclosure include systems, devices, and methods for offset removal for seismic data. The offset removal process described herein counters variable offset from the sensor/instrument system without damaging the low-frequency signal content of the record. Further, the method avoids generation of harmonics of the offset changes that affect the signal frequency band. It is assumed that frequency content of the offset process is well below the signal frequencies of practical interest for the sensor/instrument considered.

To insure data integrity, method embodiments described herein leave the phase character of the desired data unmodified. The process is configured for continuous application for the class of record considered. Thus, a zero phase filter is used. Continuous is used here to mean of indefinite duration, as contrasted with applications with a predefined duration, such as, for example, source event oriented applications having durations relative to the source event.

The method is configured for application to continuous data using a digital process with finite memory zero-phase behavior. Embodiments of the present disclosure include a symmetrical-in-time finite-impulse-response (FIR) filter. One example of such a FIR filter used herein may comprise a convolution of rectangular filter stages.

The FIR filter of the present disclosure may be implemented as a sequence of rectangular filter stages. One or more of the filter stages may approximate a sinc filter. A sinc filter is used herein to mean an idealized filter that removes all frequency components above a given bandwidth, avoids modifications to low frequency responses, and has linear phase. The sinc filter's impulse response may approximate a sinc function (e.g., $sinc(x)=sin(x)/x$, $sinc(x)=sin(\pi x)/\pi x$, and so on) in the frequency domain, and its time response may be a rectangular function. The sinc function may be described as a sine wave that decays in amplitude as $1/x$.

The sinc filter of the present disclosure is rectangular in time. Thus, it may be referred to as a sinc-in-frequency filter. In embodiments of the present disclosure, the sinc filter may be a composite of filters of different lengths. The lengths of the filters may be configured to interlace nulls with peaks and minimize ripple in an output. For example, the lowest-frequency (longest in time) null may be chosen in accord with the desired pass-band low corner, and the higher frequency nulls may be chosen to fall between the first two nulls of the lowest frequency stage such as to minimize peaks near the corner frequency of the composite frequency response. Although mathematically equivalent systems may be implemented in accordance with embodiments of the present disclosure, implementing the FIR filter as a sequence of simple filters may facilitate design, implementation, and testing.

Windowing of the sinc function may be used to avoid an infinite impulse response in both positive and negative time directions which may be characteristic of the sinc function. A window function may be used to truncate the filter to an ideal shape (limit the length of the FIR filter). It is desirable to introduce a window function that avoids generating harmful spectral spreading (or spillover). Well known window functions include Dirichlet, Bartlett, Hamm, and Hanning.

Moreover, the impulse response of the above algorithm may be problematic. Examination of the algorithm reveals that a single impulse anywhere in an averaging window causes a response at the middle of the window. Thus, the time delay of the response is not constant, and only zero when the impulse happens in the center of the window. If the window average is small relative to the signal, the difference may be dominated by the signal, but the result will not be linear phase.

The Rectangular (e.g., Dirichlet) window may also be used, such as, for example the boxcar window function. Using a boxcar function for the impulse response of the filter results in a moving average filter. The window constitutes a low-pass filter, while a high-pass filter is desired, so filter stages in accordance with embodiments of the present disclosure may be constructed by subtracting the boxcar transform from unity.

Figure 3:
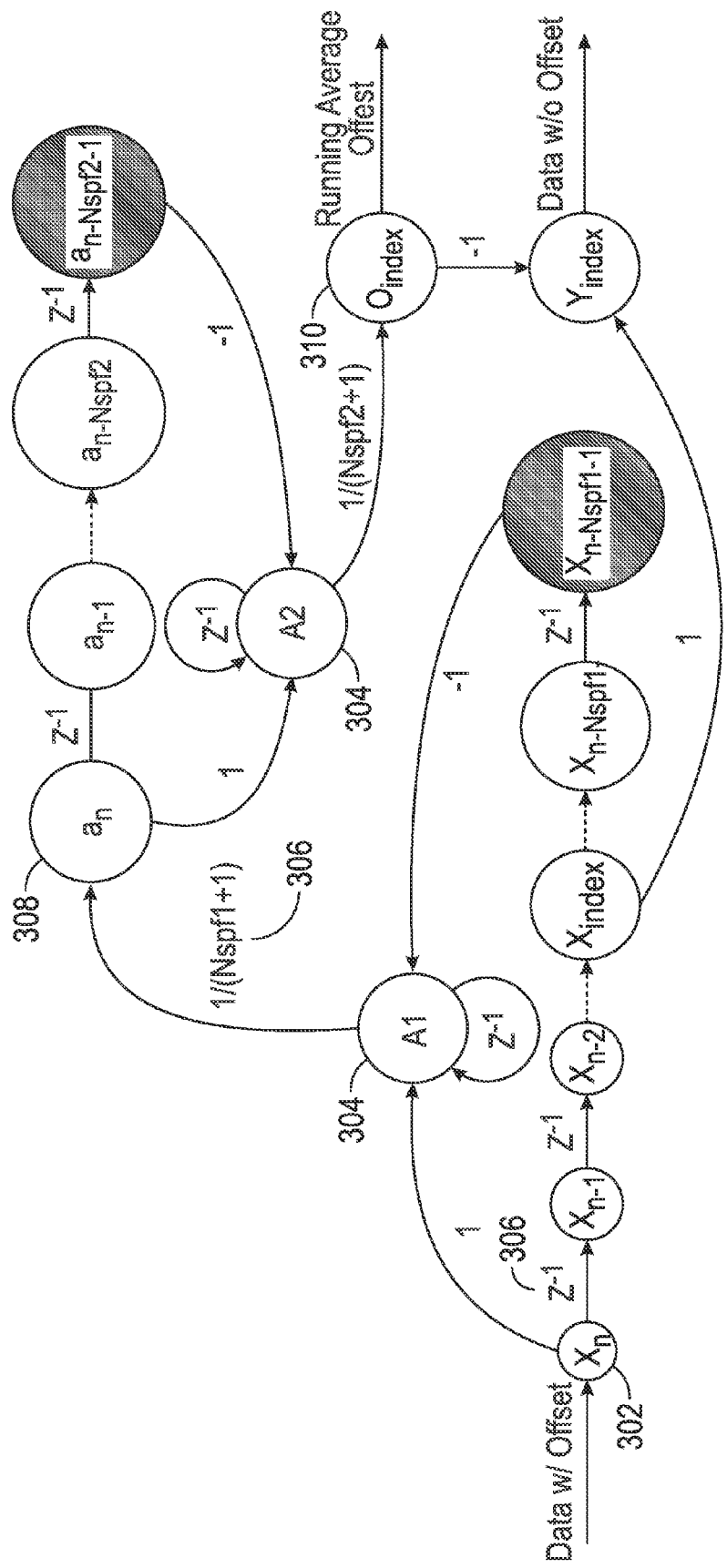
FIG. 3 shows a flow graph illustrating a logic system in accordance with embodiments of the present disclosure.

FIG. 3 shows a flow graph illustrating a logic system in accordance with embodiments of the present disclosure. The logic system implements a filter chain and includes a series of nodes 302, 304, each representing a data storage element. The filter chain implements a sequence of filters applied to samples input to the system. The filters are sinc filters having different lengths. The method is illustrated using Z transforms. When the balance equations are formed in the Z transform domain, they can be solved to establish the frequency response of the system using well known methods such as described in Chapter 2 of Oppenheim and Schafer, Digital Signal Processing, 1975, Prentice-Hall International, Inc.

Samples are sequentially introduced into the system. Each sample is first input to node $302(x_n)$. From this node 302 the sample progresses through the system moving one node 302 at a time. As each additional sample is input to $302(x_n)$ in turn, the sample occupying each node 302 is shifted to the next node, such that the sample in node $302(x_n)$ is shifted to node $302(x_{n-1})$, the sample in node $302(x_{n-1})$ is shifted to node $302(x_{n-2})$, and so on. Thus, "n" is the index of the most recent input sample, "n−1" is the sample that preceded it and "n−Nspf1" is the oldest sample retained.

Each sample is processed as it shifts from one node to the next. That is, actions 306 are performed on the sample in moving a sample from one node to another. An action comprises at least one of a scale factor and a delay. A line without a label is an implied positive identity operation—i.e., scale factor of +1—with no delay. The dotted line illustrates a continuation of nodes with a unity-gain 1-sample delay between them. Any delay between nodes is indicated above the arrow; for example, "z−1" indicates a one-sample delay.

"Nspf1" is the number of sample intervals per filter for filter stage 1 and similarly, "Nspf2" is the number of sample intervals per filter for filter stage 2. The number of sample intervals per filter is the total time delay in the filter chain.

Every node 302, 304 must have at least one input and at least one output. For multiple inputs, the input values are added to produce the resulting node value. If, for example, a difference is desired instead of a sum of two inputs, one of the inputs has a negative scale factor.

Actions 306 are executed in order from input to output. If the flow breaks into parallel paths that are later merged, the total delay of each branch is identical. This is made clear by identifying the nodes with like indices.

For nodes 304(A1) and 304(A2), a node output flow line with unity gain and unity delay loops back as an input to the same node. Thus, 304(A1) and 304(A2) are accumulators. The number of nodes 302 in the filter chain of FIG. 3 that contribute to the accumulator total is one greater than the number of delay operators (z-1) in the flow graph between the nodes that contribute to a given accumulator. The sequence of output values of 304(A1) are scaled down by the number of contributing nodes (Nspf1+1 for 304(A1)) and stored in memory locations 308($a_n$), with the subscript "n" indexing the stream of scaled first-accumulator values.

The scaled-down output of 304(A2) is depicted a being stored in node 310($O_{index}$) and made available as the running average offset value. The sequence of offset values constitutes the output of the low-pass filter implemented by the ganged filters.

The values "$y_{index}$" are the final stream of output samples with offset removed by subtracting "$O_{index}$" from the input "$x_{index}$". Note that when the newest data input sample has index "n", the culmination of the processing steps that follow the inclusion of the new sample result in an output associated with the sample having index "n–$f_{Del}$", where "$f_{Del}$" is the filter group delay.

This flow graph depiction does not dictate the actual implementation. For instance, the input sample series is shown as a FIFO (first-in-first-out shift register) but may also be implemented as a ring buffer. Any mathematically equivalent process may be substituted for the process embodied herein.

The following description illustrates computer embodiments in accordance with the present disclosure using pseudocode examples. The following description assumes that ring buffers are used to implement the two FIFO functions depicted in FIG. 3.

Prior to acquiring the initial input sample, all the processing register locations are set to zero. While the start-up period will flush any non-zero values that may remain from a previous action (including reset on power-up), an initialization insures that accumulators will not build up to a value in excess of that expected from actual data samples. The initialized variables may be non-volatile so that changes inside the interrupt service survive for the subsequent interrupt. The following pseudocode example may better illustrate typical software implementations.

```
for n from 0 to Nspf1
xn=0;
for n from 0 to Nspf2
an=0;
iRp=0;
fRp=0;
n=0;
```

The code above clears the input ring and the second stage ring and initializes ring pointers for the input ring and filter ring. The value "n" is the sample index. Presuming an interrupt occurs when a new sample is available in register DataIn, the following interrupt-based pseudocode implementation may be illustrative.

```
A1=A1-xiRp;
A1=A1+DataIn;
XiRp = DataIn;
iRp=(iRp+1) modulo (Nspf1+1);
dca1=A1/(Nspf1+1);
A2=A2-afRp;
```

-continued

```
A2=A2+dca1;
afRp =dca1;
fRp=(fRp+1) modulo (Nspf2+1);
if n>=fDel
{       OffsetOutn-fDel =A2/(Nspf2+1);
Yn-fDel = xn-fDel - OffsetOutn-fDel;
}
n=n+1;
return from interrupt;
```

The code step "A1=A1-xiRp;" reduces the accumulator by the stale value. The code step "A1=A1+DataIn;" augments the accumulator by the fresh data value. "XiRp=DataIn;" stores the fresh data sample for future use. "iRp=(iRp+1) modulo (Nspf1+1);" increments the input ring pointer modulo the ring size.

The code step "dca1=A1/(Nspf1+1);" calculates the DC Average from the first filter accumulator. The code step "A2=A2-afRp;" reduces the second accumulator by the stale value of the ring of averages. The code step "A2=A2+dca1;" augments the accumulator by the fresh average from the first filter. The code step "afRp=dca1;" stores the fresh average from the first filter for future use. The code step "fRp=(fRp+1) modulo (Nspf2+1);" increments the filter ring pointer modulo the ring size. In the code step

```
if n >= fDel,
{       OffsetOutn-fDel =A2/(Nspf2+1);
Yn-fDel = xn-fDel - OffsetOutn-fDel;       },
``` the first fDel data samples load rings and accumulators without producing output, followed by the output of data.

The code then increments the input sample counter. This interrupt service repeats indefinitely as sampling continues. Note that the first fDel samples out will not be truly offset-corrected, although they may be useful if the actual offset starts near zero. Also note that the output sample produced by a given interrupt service is associated with an input sample fDel sample intervals earlier. But the index adjustment in the "if" statement makes the filter zero-delay.

The signal correction resulting from the embodiments described herein may be illustrated using the following example case. The records for the continuous format may be set to 60,000 samples. With 0.25 mil sampling, records would be 15 seconds long, which is sufficient for a narrow low pass filter implementation. The evaluation sample rate may be set to 8 ms. To get resolution of the low-frequency end of the resulting spectrum, the series of unity samples may be followed by zero fill. Record length may be 120 seconds with a sample interval of 15 milliseconds, thus resulting in 8000 samples per record. Configuring the filter length to 15 seconds, the result is 1000 samples per filter (samples per filter=filter length/sample interval).

| | |
|---|---|
| Filter length, in time= | 15 s |
| Record length = 8* filter length= | 120 s |
| Sample Interval= | 15 ms |
| Samples per Record = record length/sample interval= (Nspr) | 8000 |
| Samples per filter = filter length/sample interval= (Nspf1) | 1000 |

Figure 4A:
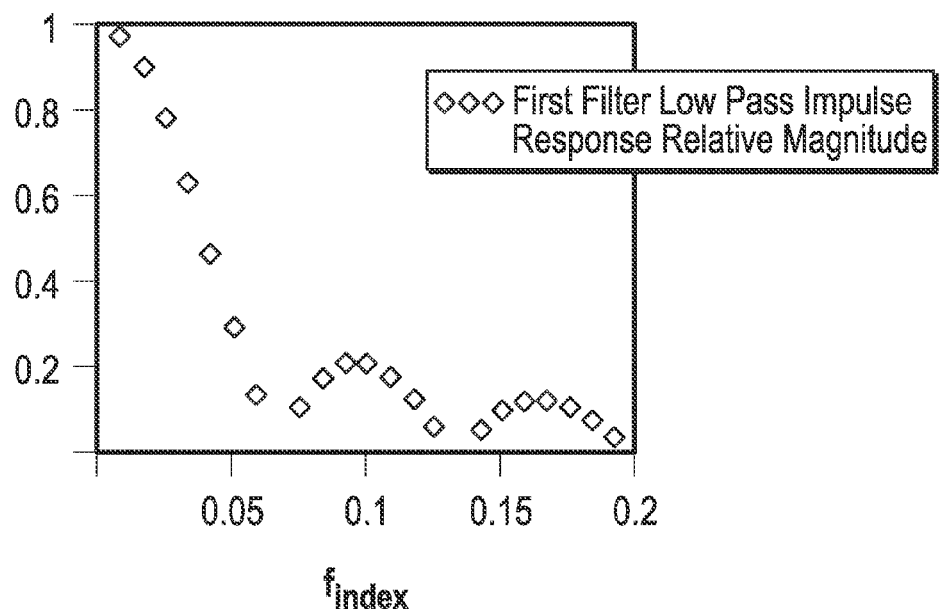
Figure 4B:
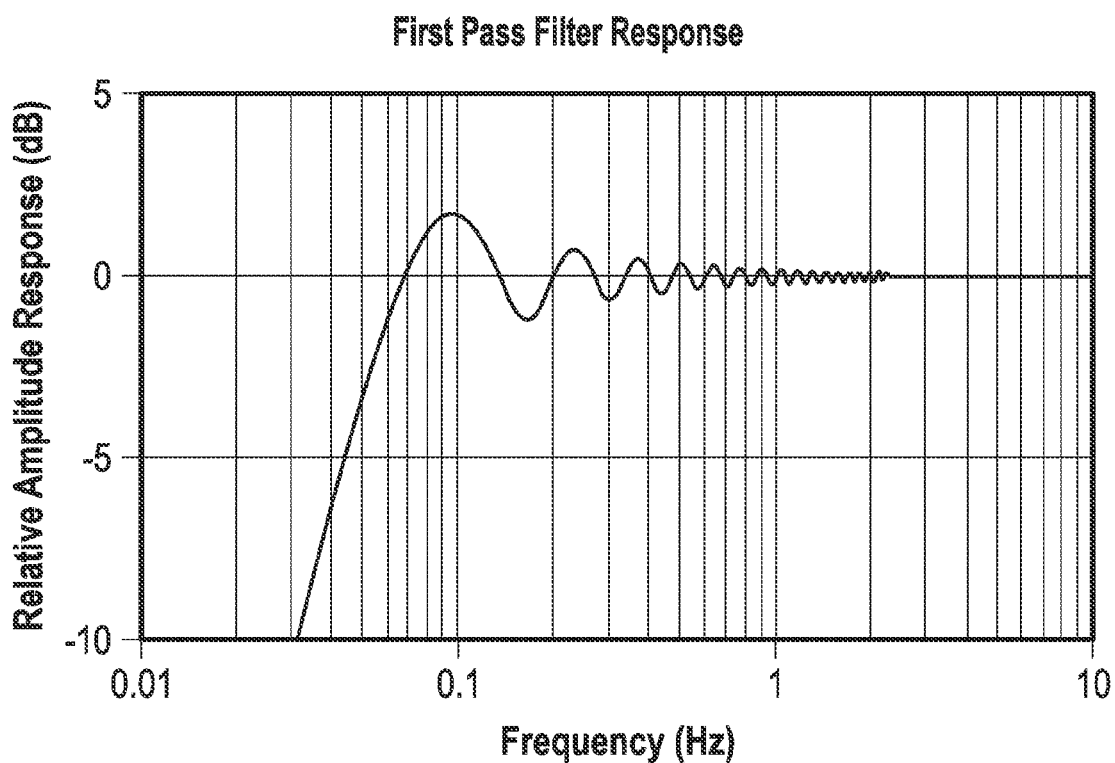
Figure 4C:
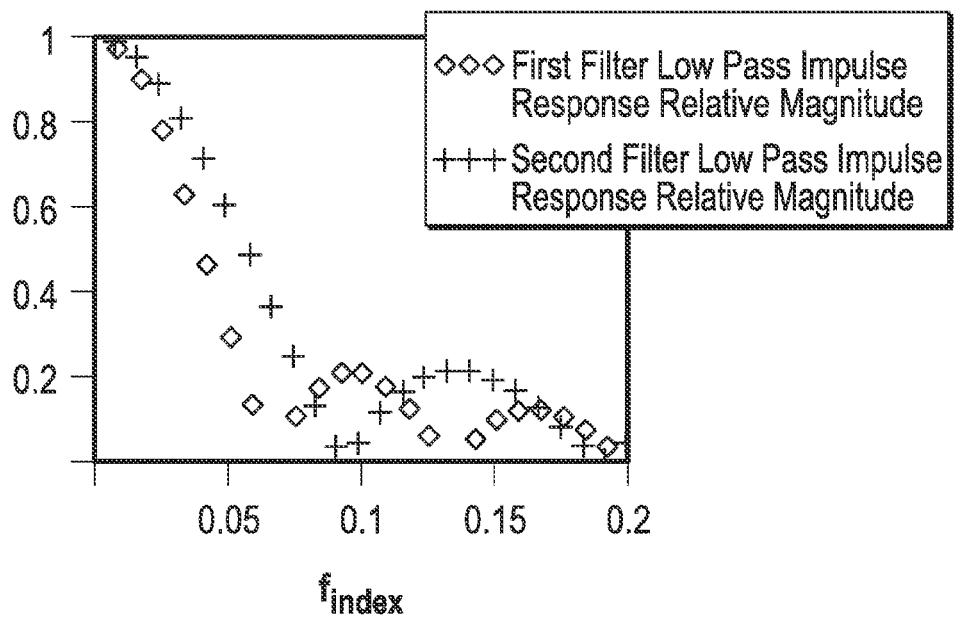
Figure 4D:
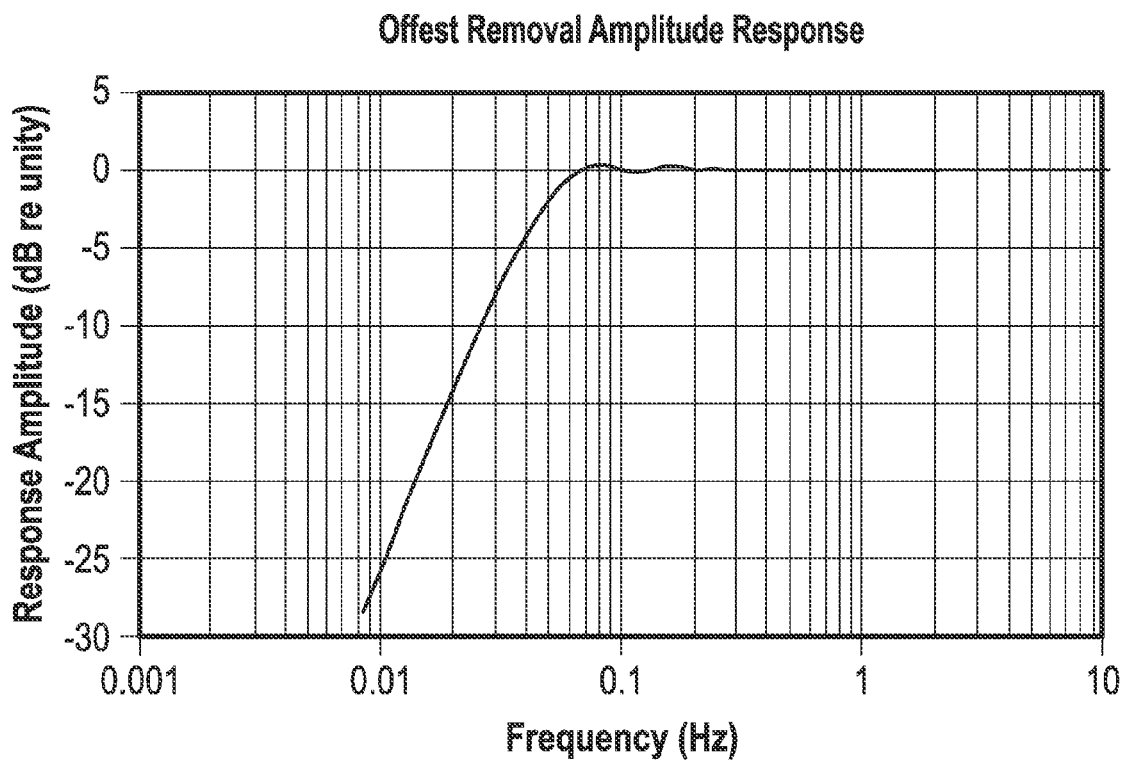
Figure 4E:
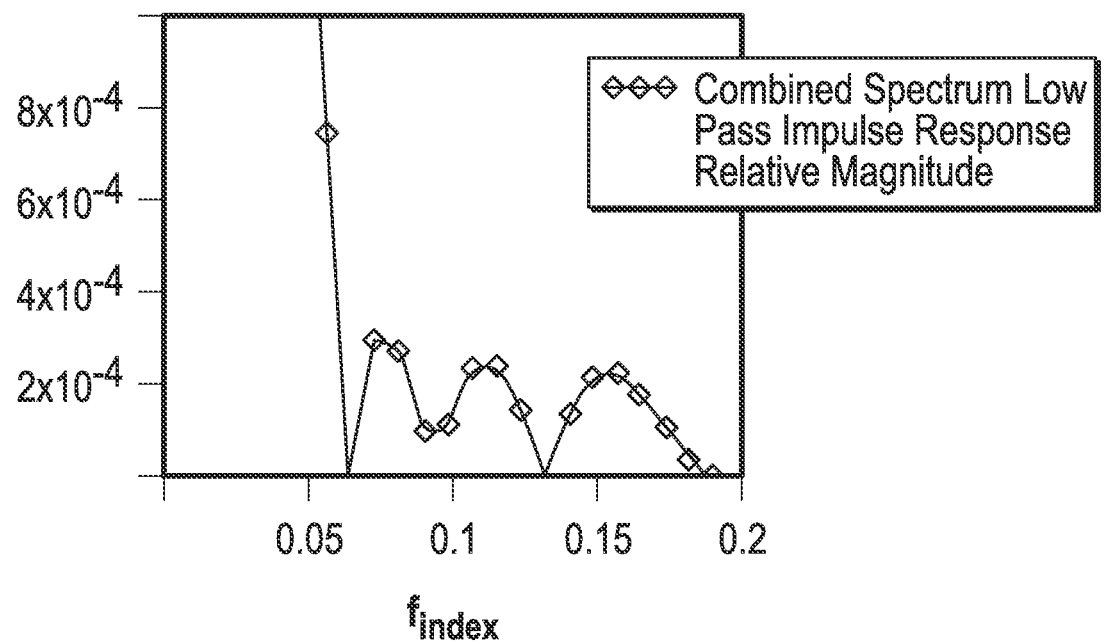

FIG. 4A illustrates the relative magnitude of the first low-pass filter response for the filter implemented with these parameters. A suitable filter stage is constructed using the filter subtracted from unity. FIG. 4B shows a first pass filter response for the filter stage illustrating a relative amplitude with respect to frequency. A significant ripple is present. To reduce the ripple in the passband, a second filter is introduced to null out the ripple peaks of the first pass, particularly the ripple peak at 0.1 Hz. The filter length, in time, is configured to be 10.5 seconds, resulting in 700 samples per filter. FIG. 4C illustrates the relative magnitude of the second low-pass filter response for the filter implemented with these parameters in comparison to the relative magnitude of the first low-pass filter response. FIG. 4D shows a combined filter response illustrating a relative amplitude with respect to frequency. Referring to FIG. 4E, substantially no ripple is present in the composite filter, because the nulls and peaks of the participant filters are interlaced and thus offset. When the two stages are cascaded, the first ripple peak is slightly more than 0.003 versus the previous 0.2.

The smoothness of the signal is further illustrated by a table of amplitudes near the low corner.

TABLE 1

| Freq.(Hz) | Amp. (dB) |
| --- | --- |
| 0.0083 | −28.4642 |
| 0.0167 | −16.8108 |
| 0.0250 | −10.4083 |
| 0.0333 | −6.3007 |
| 0.0417 | −3.5535 |
| 0.0500 | −1.7385 |
| 0.0583 | −0.6105 |
| 0.0667 | 0.0000 |
| 0.0750 | 0.2322 |
| 0.0833 | 0.2150 |
| 0.0917 | 0.0719 |
| 0.1000 | −0.0879 |
| 0.1083 | −0.1861 |
| 0.1167 | −0.1906 |
| 0.1250 | −0.1145 |
| 0.1333 | 0.0000 |
| 0.1417 | 0.1058 |
| 0.1500 | 0.1691 |
| 0.1583 | 0.1778 |
| 0.1667 | 0.1411 |

Figure 4F:
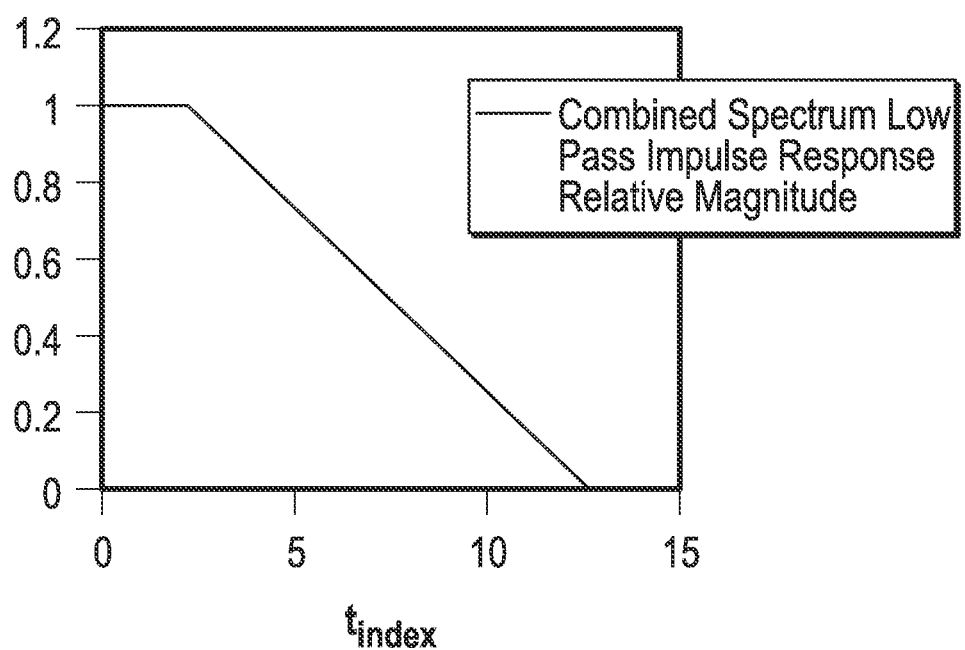

As shown in FIG. 4F, the convolution of the two-pass rectangular (Dirichlet) window produces a trapezoidal window when the two rectangles are of different length. However, a triangular (Bartlett) window results if the windows are equal in length. One benefit of the multiple-pass approach is that no multiplies are needed to achieve the taper. The differences in length accomplish a larger number of nulls in the low-pass portion. Note in the first spectrum below that the low-pass reject band has a side-lobe peak just under 0.1 Hz with amplitude a bit over 0.2 relative to the DC response. The second filter is configured such that its first null point suppresses that first stage peak when the two are cascaded.

Referring to FIG. 4G, illustrating a high pass impulse response, it is apparent that direct implementation of a high-pass FIR would require many terms of varying magnitude and be much more complex than the two-pass convolution to obtain a low-pass for subtraction from the data stream.

While only two stages are shown in the described embodiment, it is possible to continue reducing ripple by adding continued stages, resulting in any number of stages for the final algorithm. However, for many applications, the two-stage approach illustrated in detail may be sufficient.

Figure 5D:
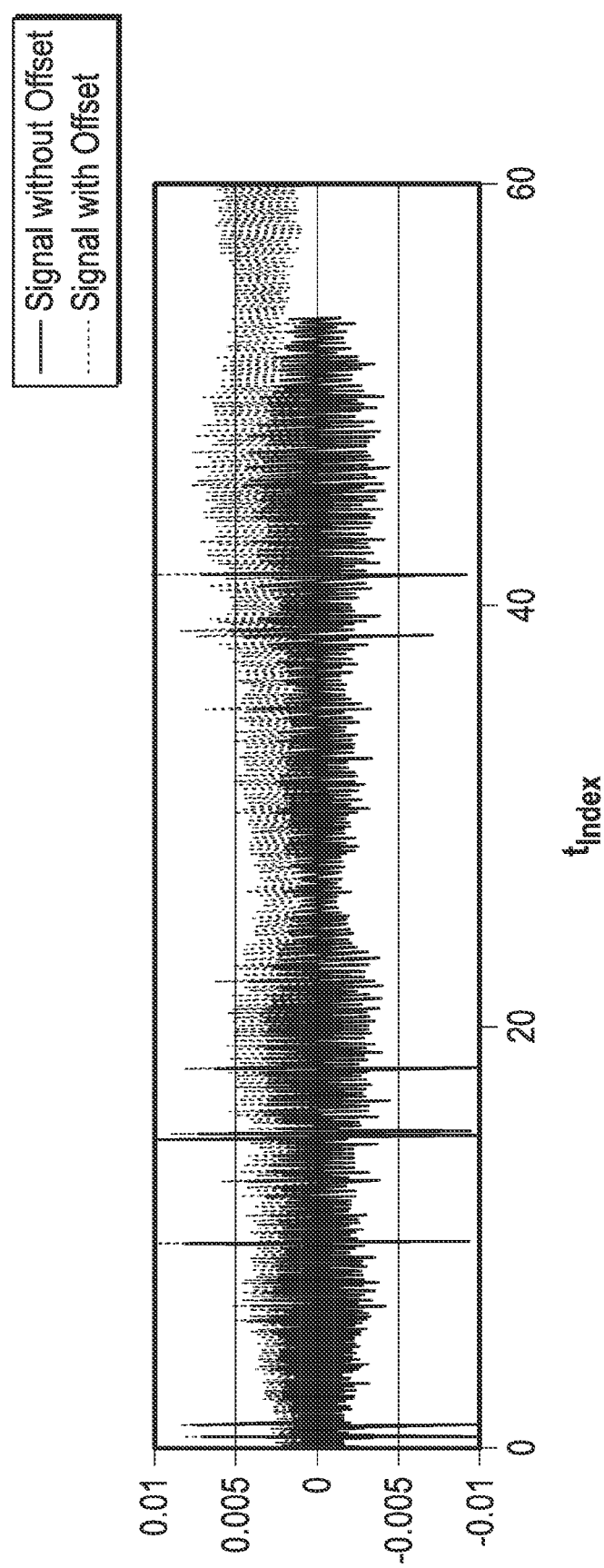
FIGS. 5D-5F show a comparison between signal segments before offset removal and after offset removal.
Figure 5E:
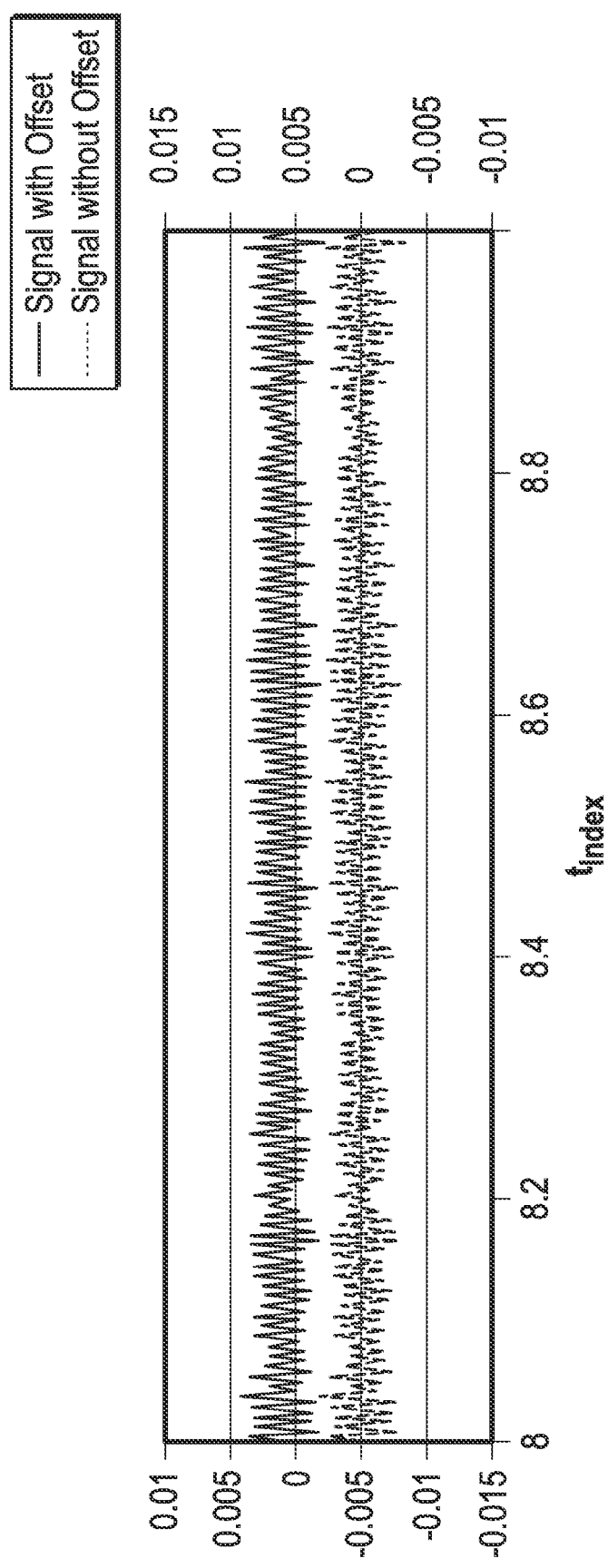
Figure 5F:
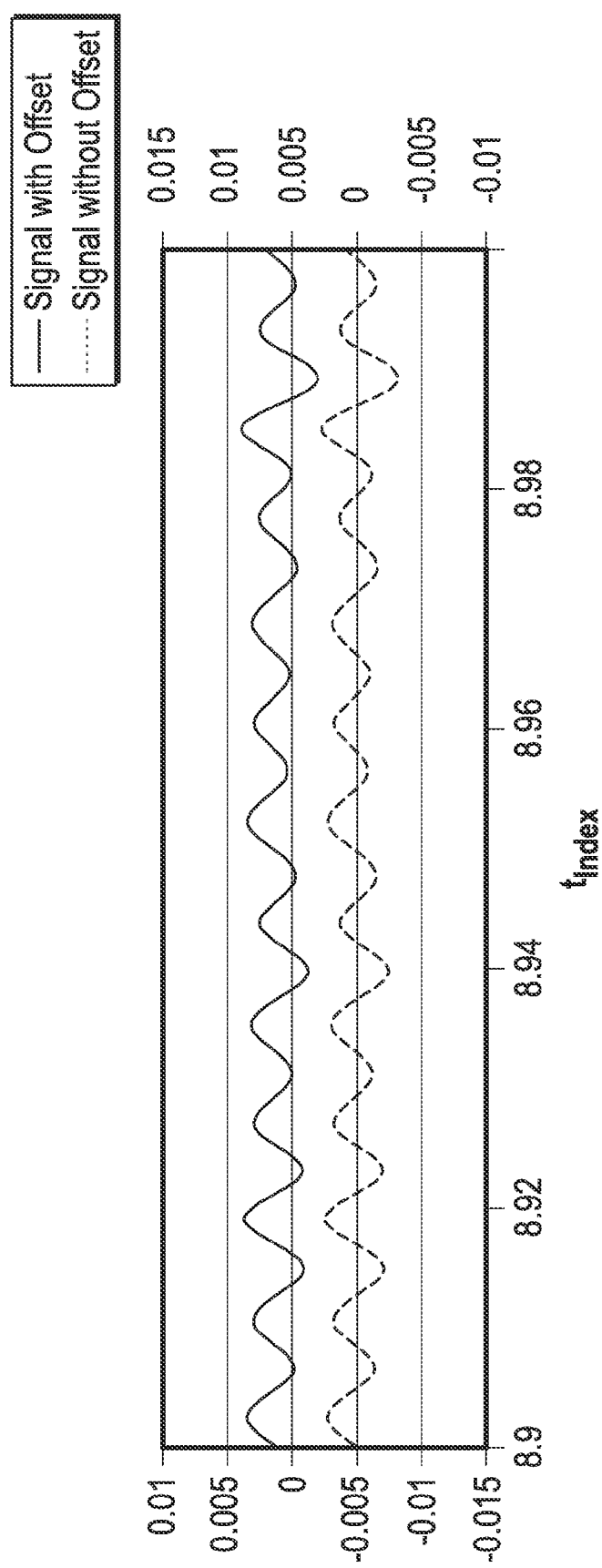

FIGS. 5A-5C show example seismic signals during the first minute of three start-up periods of a sensor laying horizontal with only ambient noise present. The sample interval was 1 millisecond. The signals are scaled to Defloat, +120 dB. The record includes 60,000 samples. Filtering the signals using the filter of FIG. 3, using a first stage length of 15 seconds and a second stage length of 10.5 seconds with a sample interval of 2 milliseconds, results in an improved signal with DC offset removed. FIGS. 5D-5F show segments of the discrete signal before offset removal compared to the discrete signal after offset removal. Note that FIGS. 5E & 5F show separate amplitude axes offset to provide clearer recognition of each signal.

Figure 6:
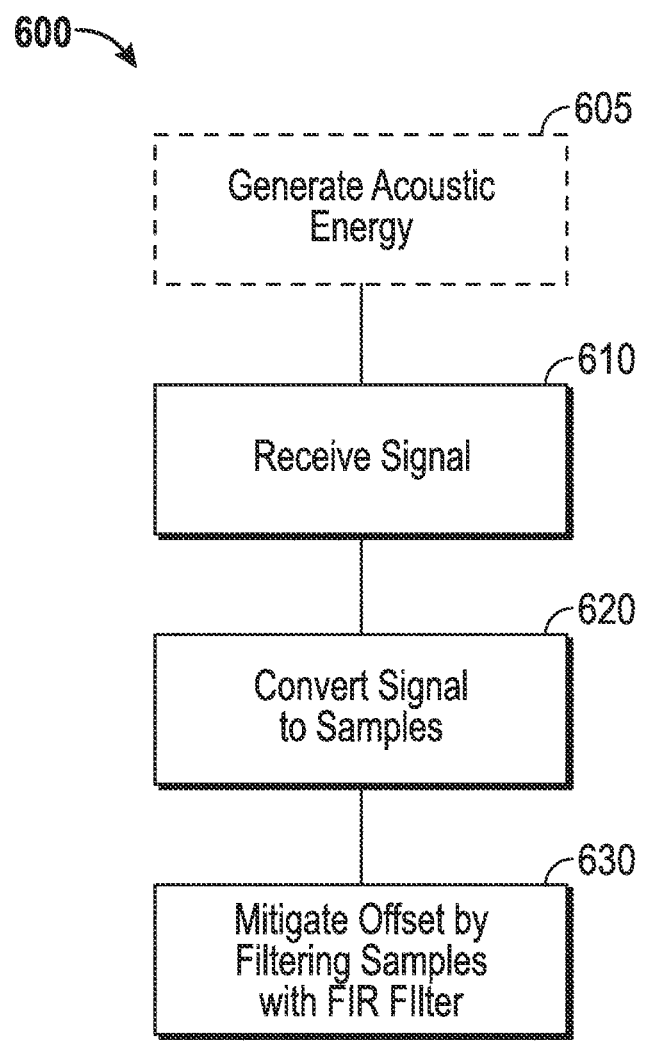
FIG. 6 shows a flow chart for a method for another embodiment according to the present disclosure.

FIG. 6 shows a flow chart 600 for conducting a seismic survey according to one embodiment of the present disclosure. Step 610 may include receiving a signal from at least one seismic sensor. The signal may be indicative of reflections of acoustic energy from an earth surface, and may be received directly or indirectly. The signal may include an unknown direct current (DC) offset.

Step 620 may include converting the signal to a sequence of samples. Each sample may be represented by a bit string. Converting the signal to a sequence of samples may be carried out using sampling circuitry. The sampling circuitry may include analog-to-digital sampling circuitry and/or digital sampling circuitry. Digital sampling circuitry may be configured to sample a discrete signal, which may include providing a sequence of values of a discrete signal. Analog-to-digital sampling circuitry may include an analog-to-digital converter configured to convert an analog signal from the seismic sensor to a discrete signal in addition to circuitry for sampling a discrete signal. In either case, sampling circuitry may be configured to provide a sequence of samples, which are in discrete (e.g., digital or bitwise) form.

For example, step 610 may be carried out by receiving an analog signal at an analog-to-digital converter ('ADC') from at least one seismic sensor in electrical communication with the analog-to-digital converter. In some embodiments, the sensor may be part of a sensor unit commonly referred to as a "digital sensor." Such a sensor unit may be self-contained in that it delivers a discrete signal. The sensor unit may have ADC circuitry integrated with the analog sensor in the sensor unit, or the sensor may be natively digital, as in some microelectromechanical accelerometers and the like. Thus, upon the sensor sensing an analog value (e.g., acceleration) the integrated circuitry may perform step 610 and/or 620 before delivering a digital bit stream as the output of the circuit, or these steps may be performed using circuitry in the FTU 304 or in other locations in the system. In other embodiments, the native digital signal from the sensor may be sampled. The system may include any combination of measurement sensor (e.g., a transducer) and supporting circuitry that converts physical motion to discrete (e.g., digitized) electrical data. This can apply to both analog sensors as well as natively digital sensors.

Step 630 may include mitigating sensor offset from a sequence of samples representative of the seismic signal by filtering the sequence of samples using a symmetrical-in-time finite impulse response (FIR) filter. The FIR filter may approximate a sinc-in-frequency filter. Filtering the sequence of samples may be carried out by processing the sequence of samples using a plurality of filter stages that are rectangular in time. The length of one filter stage of the plurality of filter stages may be different than the length of another filter stage of the plurality of filter stages. The lengths of the plurality of filter stages may be configured to minimize signal ripple in an impulse response associated with the FIR filter by aligning at least one peak of one filter stage of the plurality of filter stages with at least one null of another filter stage of the plurality of filter stages.

Optional step 605 may include generating the acoustic energy from a seismic source. Other optional steps may include storing or transmitting the filtered samples. For example, the compressed seismic data may be transmitted to a recording computer, either directly or indirectly.

The term non-transitory computer-readable media as used herein comprises all computer-readable media with the sole exception of a transitory, propagating signal. The non-transitory computer-readable medium may include at least one of: (i) a ROM, (ii) an EPROM, (iii) an EEPROM, (iv) a flash memory, and (v) an optical disk.

Portions of the present disclosure pertaining to "software aspects" of the disclosure are used herein. These aspects may include computer program instructions or other logic embodied on or in a non-transitory computer-readable medium product that, when executed by at least one processor, causes the at least one processor to perform a method as described herein. These aspects include detailed description and claims in terms of logic, software or software implemented aspects typically encoded on a variety of media including, but not limited to, computer-readable media, machine-readable media, program storage media, or computer program product. Such media may be handled, read, sensed and/or interpreted by an information processing device. Those skilled in the art will appreciate that such media may take various forms such as cards, tapes, magnetic disks (e.g., floppy disk or hard drive) and optical disks (e.g., compact disk read only memory ("CD-ROM") or digital versatile (or video) disc ("DVD")). Any embodiment disclosed herein is for illustration only and not by way of limiting the scope of the disclosure or claims.

The term "information processing device," "processor," "computer," or "controller" as used herein includes, but is not limited to, any device that transmits, receives, manipulates, converts, calculates, modulates, transposes, carries, stores or otherwise utilizes information. In several non-limiting aspects of the disclosure, an information processing device includes a computer that executes programmed instructions for performing various methods.

The term "seismic devices" means any device that is used in a seismic spread, including, but not limited to sensors, sensor stations, receivers, transmitters, power supplies, control units, etc. Substantially no offset as used herein means that the offset of delivered data is sufficiently small relative to the signal as to be unnoticeable, such as, for example, smaller than the sensor/instrument noise floor. By natively digital, it is meant that the sensor provides a digital signal without first providing an analog signal.

The disclosure herein is provided in reference to particular embodiments and processes to illustrate the concepts and methods. Such particular embodiments and processes are not intended to limit the scope of the disclosure or the claims. All such modifications within the scope of the claims and disclaimers are intended to be part of this disclosure.

While the foregoing disclosure is directed to the one mode embodiments of the disclosure, various modifications will be apparent to those skilled in the art. It is intended that all variations be embraced by the foregoing disclosure.

What is claimed is:

1. A system for conducting a seismic survey, comprising:
   at least one seismic sensor configured to supply a signal responsive to reflections of acoustic energy from an earth surface, the signal comprising a direct current (DC) offset; and
   at least one processor configured to:
   mitigate sensor offset from a sequence of samples representative of the signal by filtering the sequence of samples using a plurality of filter stages comprised of rectangular-in-time finite impulse response (FIR) filters, and
   wherein:
   the length of one filter stage of the plurality of filter stages is different than the length of another filter stage of the plurality of filter stages, and
   wherein the lengths of the filter stages are configured to minimize signal ripple in an impulse response associated with the FIR filter by aligning at least one null of one filter stage of the plurality of filter stages between two other nulls of another stage of the plurality of filter stages to minimize peaks of a composite frequency response.

2. The method of claim 1, wherein the sequence of samples comprises at least one of i) discrete samples of an analog signal taken at regular intervals; ii) discrete samples of a discrete signal taken at regular intervals; iii) a sequence of values of a discrete signal.

3. The system of claim 1, wherein the FIR filters approximate a sinc-in-frequency filter.

4. The system of claim 1, where in the at least one seismic sensor includes a geophone.

5. A method of conducting a seismic survey, comprising:
   receiving a signal from at least one seismic sensor, the signal indicative of reflections of acoustic energy from an earth surface and comprising a direct current (DC) offset; and
   mitigating sensor offset from a sequence of samples representative of the seismic signal by filtering the sequence of samples using a plurality of filter stages comprised of rectangular-in-time finite impulse response (FIR) filters, and
   wherein:
   the length of one filter stage of the plurality of filter stages is different than the length of another filter stage of the plurality of filter stages, and
   wherein the lengths of the filter stages are configured to minimize signal ripple in an impulse response associated with the FIR filter by aligning at least one null of one filter stage of the plurality of filter stages between two other nulls of another stage of the plurality of filter stages to minimize peaks of a composite frequency response.

6. The method of claim 5, wherein the sequence of samples comprises at least one of i) discrete samples of an analog signal taken at regular intervals; ii) discrete samples of a discrete signal taken at regular intervals; iii) a sequence of values of a discrete signal.

7. The method of claim 5, wherein the FIR filters approximate a sinc-in-frequency filter.

8. The method of claim 5, wherein the signal is an analog signal, the method further comprising:
   converting the analog signal to a discrete signal comprising the sequence of samples.

9. The method of claim 5, further comprising generating the acoustic energy from a seismic source.

10. A method of mitigating sensor offset from a sequence of samples representative of a response of a seismic sensor to reflections of acoustic energy from an earth surface, comprising:
    filtering the sequence of samples using a rectangular-in-time finite impulse response (FIR) filter, and wherein:

the length of one filter stage of the plurality of filter stages is different than the length of another filter stage of the plurality of filter stages, and wherein the lengths of the filter stages are configured to minimize signal ripple in an impulse response associated with the FIR filter by aligning at least one null of one filter stage of the plurality of filter stages between two other nulls of another stage of the plurality of filter stages to minimize peaks of a composite frequency response.

11. The method of claim 10, wherein the sequence of samples comprises at least one of i) discrete samples of an analog signal taken at regular intervals; ii) discrete samples of a discrete signal taken at regular intervals; iii) a sequence of values of a discrete signal.

12. The method of claim 10, wherein the FIR filter approximates a sinc-in-frequency filter.

* * * * *